United States Patent
Bergeron

(10) Patent No.: US 9,578,141 B2
(45) Date of Patent: Feb. 21, 2017

(54) PACKET FLOW MODIFICATION

(71) Applicant: Ixia, Calabasas, CA (US)

(72) Inventor: Matthew R. Bergeron, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 9 days.

(21) Appl. No.: 14/178,260

(22) Filed: Feb. 11, 2014

(65) Prior Publication Data

US 2015/0124840 A1    May 7, 2015

Related U.S. Application Data

(60) Provisional application No. 61/899,255, filed on Nov. 3, 2013.

(51) Int. Cl.
 *H04L 12/413*  (2006.01)
 *H04L 29/06*   (2006.01)
 *H04L 12/851*  (2013.01)
 *H04L 12/801*  (2013.01)

(52) U.S. Cl.
 CPC ............. *H04L 69/161* (2013.01); *H04L 47/19* (2013.01); *H04L 47/2483* (2013.01); *H04L 47/34* (2013.01); *H04L 69/166* (2013.01); *H04L 47/193* (2013.01)

(58) Field of Classification Search
 CPC .... H04L 67/1097; H04L 69/14; H04L 1/1845; H04L 47/193; H04L 69/161; H04L 67/1002; H04L 1/1635; H04L 69/16; H04L 69/166; H04L 1/1642; H04L 47/19; H04L 47/34; H04L 47/2483

USPC ........ 370/254, 389, 392, 474, 338, 394, 476
See application file for complete search history.

(56) References Cited

U.S. PATENT DOCUMENTS

| | | | |
|---|---|---|---|
| 7,519,070 B2 | 4/2009 | Van Lunteren | |
| 7,542,472 B1* | 6/2009 | Gerendai | H04L 1/1635 370/338 |
| 7,890,991 B2 | 2/2011 | Kay | |
| 7,937,756 B2 | 5/2011 | Kay | |
| 8,346,918 B2 | 1/2013 | Kay | |
| 2004/0073550 A1* | 4/2004 | Meirovitz | G06F 17/30985 |
| 2005/0066085 A1* | 3/2005 | Kobayashi | 710/62 |
| 2007/0223472 A1* | 9/2007 | Tachibana et al. | 370/389 |
| 2009/0290580 A1* | 11/2009 | Wood et al. | 370/389 |
| 2010/0008359 A1 | 1/2010 | Kay | |

(Continued)

OTHER PUBLICATIONS

"ngrep," Wikipedia, http://en.wikipedia.org/wiki/Ngrep, pp. 1-4 (Jul. 5, 2014).

(Continued)

*Primary Examiner* — Kwang B Yao
*Assistant Examiner* — Harun Chowdhury
(74) *Attorney, Agent, or Firm* — Jenkins, Wilson, Taylor & Hunt, P.A.

(57) ABSTRACT

Methods, systems, and computer readable media for packet flow modification are disclosed. According to one method, the method includes receiving one or more packets associated with a packet flow. The method also includes modifying payload information in the one or more packets. The method further includes receiving a subsequent packet associated with the packet flow. The method also includes modifying transport layer or higher layer information in the subsequent packet using information associated with the modified payload information or the packet flow.

19 Claims, 6 Drawing Sheets

(56) References Cited

U.S. PATENT DOCUMENTS

2014/0067987 A1* 3/2014 Agrawal et al. ............. 709/213

OTHER PUBLICATIONS

"cPacket Radically Simplifies How Data Center and Cloud Professionals Pinpoint Problems," cPacket Networks, pp. 1-2 (Jan. 28, 2013).

* cited by examiner

PACKET FLOW MODIFICATION

PRIORITY CLAIM

This application claims the benefit of U.S. Provisional Patent Application Ser. No. 61/899,255 filed Nov. 3, 2013; the disclosure of which is incorporated herein by reference in its entirety.

TECHNICAL FIELD

The subject matter described herein relates to packet communications. More specifically, the subject matter relates to methods, systems, and computer readable media for packet flow modification.

BACKGROUND

Many nodes (e.g., computing platforms, smartphones, or network devices) may communicate data via packets, e.g., Internet protocol (IP) packets. Generally, one or more related packets may be referred to as a packet flow. For example, a node may receive media from a web server via a packet flow of one or more related packets. In this example, the packet flow may be identifiable using one or more common attributes associated with each packet of the packet flow. These common attributes may be known as a flow identifying tuple and may include a source address, a destination address, a source port number, a destination port number and/or protocol(s) in use.

When communicating data via sequenced or ordered packets, a protocol, such as a transmission control protocol (TCP) or a stream control transmission protocol (SCTP), may be used to provide reliable, ordered, and/or error-checked data (e.g., a stream of bytes or octets) between applications executing on different nodes. Some network operators, equipment testers, or other entities may want to modify data being communicated via packets. Conventional packet flow modification requires extensive resources and can be time consuming. For example, a packet modification entity may intercept or collect an entire packet flow, terminate the packet flow, (re)assemble data from the packets (e.g., de-packetize the data from the packet flow), perform modifications to the data, repackage the data into new packets (e.g., re-packetize the data into a new packet flow), and send the new packets to a destination. Since conventional packet flow modification requires packet deconstruction or de-packetizing of a packet flow and/or other resource intensive operations prior to modification, conventional packet flow modification cannot be perform at line rate or near line rate.

Accordingly, a need exists for improved methods, systems, and computer readable media for packet flow modification.

SUMMARY

Methods, systems, and computer readable media for packet flow modification are disclosed. According to one method, the method includes receiving one or more packets associated with a packet flow. The method also includes modifying payload information in the one or more packets. The method further includes receiving a subsequent packet associated with the packet flow. The method also includes modifying transport layer or higher layer information in the subsequent packet using information associated with the modified payload information or the packet flow.

According to one system, the system includes a flow modification module (FMM). The FMM is configured to receive one or more packets associated with a packet flow. The FMM is also configured to modify payload information in the one or more packets. The FMM is further configured to receive a subsequent packet associated with the packet flow. The FMM is also configured to modify transport layer or higher layer information in the subsequent packet using information associated with the modified payload information or the packet flow.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "byte" or "octet" refer to eight bits of data.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for packet flow modification. In accordance with some aspects of the subject matter described herein, packets associated with a packet flow may be inspected and modified, e.g., at line rate or near line rate. Advantageously, some aspects of the subject matter described herein include functionality for modifying one or more packets that exist in a packet flow (e.g., a sequence of related packets) without requiring packets associated with that packet flow to be deconstructed and/or reconstructed. By modifying the contents (e.g., payloads) of one or more packets in a packet flow and efficiently modifying subsequent packets associated with the same packet flow in a way that avoids resource intensive packet deconstruction and/or reconstruction, resources are more efficiently utilized and processing delays are diminished.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
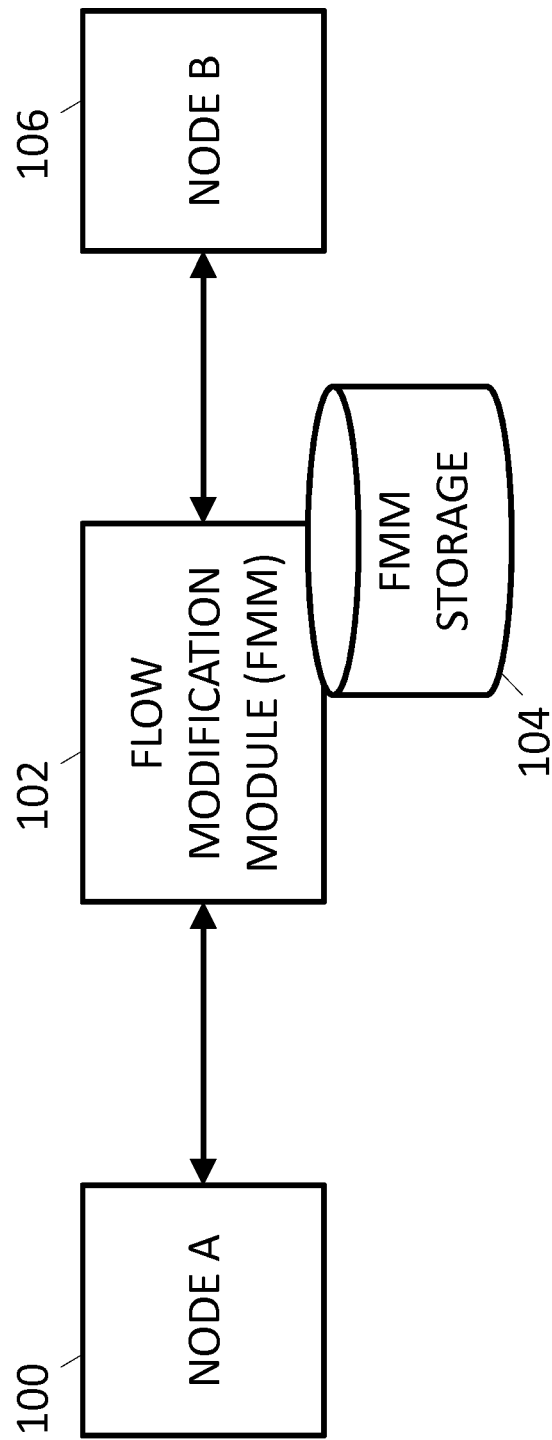
FIG. 1 is a diagram illustrating an exemplary flow modification module (FMM) for performing packet flow modification according to an embodiment of the subject matter described herein.

FIG. 1 is a diagram illustrating an exemplary flow modification module (FMM) 102 for performing packet flow modification according to an embodiment of the subject matter described herein. Referring to FIG. 1, each of nodes 100 and 106 may represent any suitable entity (e.g., a computing platform or a device) capable of communicating data via packets.

FMM 102 may represent any suitable entity (e.g., a computing platform, a logic device, an ASIC, or an FPGA) for performing one or more aspects associated with packet flow modification. For example, FMM 102 may represent an IP packet interceptor or inspection device capable of receiving or intercepting packets associated with various protocols communicated to or from node A 100 and/or node B 106. FMM 102 may be configured to perform packet flow medication such that packets associated with a packet flow are modified at line rate or near line rate. For example, in contrast to terminating (e.g., de-packetizing) a packet flow, modifying a data stream derived from the packet flow, and creating (e.g., re-packetizing) a new flow using the modified data stream, FMM 102 may modify data in packets associated with a packet flow and may also modify transport layer and/or higher layer information (e.g., sequence identifying information) in subsequent packets associated with the packet flow. By updating the transport layer information and/or higher layer information in subsequent packets, the packets and/or its related flow may appear legitimate (e.g., uncorrupted) and/or unmodified to a second receiver (e.g., node B 106). In contrast, if the transport layer information and/or higher layer information in subsequent packets is not updated and if sequence identifying information is incorrect, a second receiver may reject the subsequent packets and attempt to re-request the packets or terminate the packet flow.

FMM 102 may include one or more communications interfaces for receiving and sending packets; such as IP packets, IP version 4 (v4) packets, IP version 6 (v6) packets, transmission control protocol (TCP) packets, stream control transmission protocol (SCTP) packets, real-time transport protocol (RTP) packets, or reliable data protocol (RDP) packets, packets using a tunneling protocol, and/or packets using a protocol that provides a sequencing capability.

FMM 102 may include functionality (e.g., software executing on a processor or other hardware) for inspecting received packets, or portions therein, for particular data, e.g., one or more byte sequences. For example, FMM 102 may be configured to search payload portions of one or more packets using a search pattern or target data pattern (e.g., a string of text, a number sequence, a bit sequence, a byte sequence, or a regular expression). In this example, a target data pattern may be used to find matches spread across (e.g., stored in payload portions) of two or more packets. In another example, FMM 102 may be configured to search payload portion for data to modify based on relative location, such as message offsets or byte offsets.

In some embodiments, FMM 102 may be configured to log or store information about one or more packets and/or a related packet flow. For example, in response to searching and identifying relevant data for modification in one or more packets, FMM 102 may log or store a flow identifying tuple (e.g., a source address, a destination address, source port information, destination port information, and/or one or more protocols in use) for identifying related packets and/or other information associated with the one or more packets. Exemplary stored data associated with a packet or packet flow may include a flow identifying tuple, a packet identifier, a matched bytes bitmask, and/or transport layer or higher layer information, such as byte sequence identifying information or message sequence identifying information, maximum segment size (MSS) information, packet byte size information, and/or packet length information.

FMM 102 may include functionality (e.g., software executing on a processor or other hardware) for modifying received packets associated with a packet flow, or portions therein. In some embodiments, FMM 102 may use a search pattern or an offset value to determine whether a packet contains matching data. For example, after identifying particular data using a target data pattern, FMM 102 may be configured to replace the particular data with replacement data, e.g., data based on a replacement data pattern or user-defined data.

In some embodiments, FMM 102 may include functionality for generating additional packets and/or moving or segmenting data (e.g., a payload portion) between two or more packets. For example, FMM 102 may be configured to replace all instances of a byte sequence "now" with the byte sequence "immediately" in all packets associated with a packet flow. In this example, if a first packet contains the byte sequence "now" but is already at a maximum packet size or length, FMM 102 may be configured to delete the byte sequence "now" from the first packet and may generate a new packet for containing the byte sequence "immediately". Prior to, concurrently with, or subsequent to generating a new packet, the modified first packet may be sent to another hop or destination. After generating the new packet, the new packet may be sent to another hop or destination.

In some embodiments, FMM 102 may segment payload information in various ways between a first packet and a succeeding or subsequent packet. For example, after determining that a new packet must be generated to include or contain at least a portion of modified payload information, a percentage (e.g., 50%, 25%, etc.) of a payload portion associated with a preceding packet may be moved to the new packet. In this example, a portion of the modified payload information may be contained in the preceding packet and the remaining portion may be contained in the new packet.

In some embodiments, instead of generating a new packet for including or containing additional payload information, FMM 102 may include functionality for adding the additional payload information to a subsequent packet. For example, if a first packet has reached a maximum size limit, but a subsequent packet has not reached a maximum size limit, FMM 102 may modify the subsequent packet to include at least a portion of the additional payload information.

In some embodiments, instead of generating a new packet for including or containing additional payload information, FMM 102 may include functionality for using a padding portion or other locations for storing at least a portion of the additional payload information. For example, a packet may include TCP header padding for ensuring TCP header ends and data begins on a 32 bit boundary. In this example, FMM 102 may be able to use all or any of TCP header padding associated with a packet prior to generating a new packet, e.g., if the packet size or its payload size is nearing a limit (e.g., a MSS value).

FMM 102 may include functionality for performing packet processing prior to sending modified packets onward, e.g., to another hop or destination. For example, after modifying a payload portion of a packet, FMM 102 may be configured to compute a cyclic redundancy check (CRC) or checksum and to include the computed CRC or checksum in the packet. In another example, after modifying a payload portion of a packet, FMM 102 may be configured to modify a CRC or checksum in the packet. FMM 102 may perform other modifications, such as changing certain header information, prior to sending modified packets onward, e.g., towards node A 100 or node B 106.

FMM 102 may include functionality for modifying transport layer information or higher layer information layer (e.g., open systems interconnection (OSI) model layers 4-7) in packets associated with a packet flow. For example, after FMM 102 has modified payload information of a first TCP packet associated with a packet flow, a second TCP packet associated with the packet flow may be received and modified such that transport layer information in the second TCP packet is adjusted using a delta byte length value associated with the modified payload information. In this example, the delta byte length value may be the difference between the byte size of the modified payload information and the byte size of the original (e.g., pre-modified or unmodified) payload information. In the example above, if the delta byte length value is "+4" bytes, FMM 102 may modify a TCP sequence identifier (e.g., "SeqID") parameter value associated with the second packet by increasing the SeqID value by 4 (e.g., SeqID: "30" would be changed to Seq ID: "34").

In some embodiments, FMM 102 may be configured to modify packet flows associated with protocols that use message sequencing or packet sequencing, such as RTP or SCTP. In such embodiments, after a payload modification of a packet associated with a particular packet flow, sequence identifying information (e.g., a message sequence number) may not change for subsequent packets associated with the same flow unless the payload modification resulted in an additional packet being generated. In such embodiments, if an additional packet is generated for a packet flow in response to a modification, FMM 102 may be configured to modify a message sequence number for subsequent packets, e.g., by increasing the message sequence number by one.

After modifying transport layer information and/or higher layer information and/or performing other packet processing and/or modifications, FMM 102 may send modified packets associated with a packet flow to another hop or destination.

FMM storage 104 may represent any suitable entity (e.g., a non-transitory computer readable medium or a memory device) for storing data (e.g., flow identifying tuples, transport layer information, or higher layer information) associated with packet flows and/or packets. FMM storage 104 may be communicatively coupled to FMM 102. In some embodiments, FMM storage 104 may be integrated with FMM 102 or may be integrated with a node distinct from FMM 102, such as node A 100 or node B 106.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity, e.g., FMM 102 may be integrated with node A 100 or node B 106.

Figure 2:
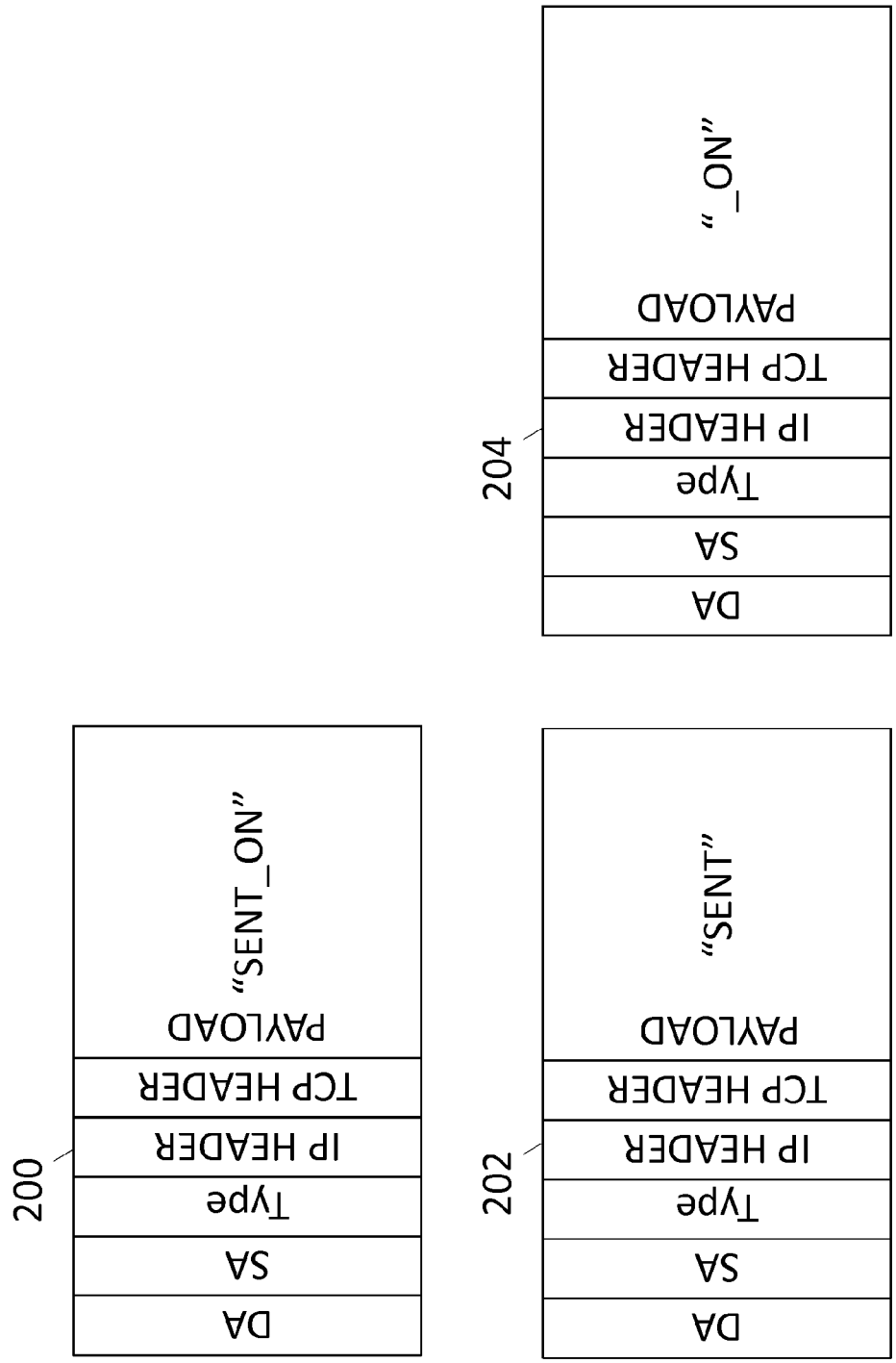
FIG. 2 is a diagram illustrating exemplary Ethernet frames containing IP packets.

FIG. 2 is a diagram illustrating exemplary frames 200, 202, 204. Each of frames 200, 202, and 204 may represent an Ethernet frame containing an IP packet using a TCP or another transport layer protocol. Each of frames 200, 202, and 204 may include header information and a payload portion. Each of frames 200, 202, and 204 may include a destination medium access control (MAC) address (DA), a MAC source address (SA), a type of service identifier (TYPE), IP header information (IP HEADER), and/or TCP header information (TCP HEADER).

IP header information may include data stored in one or more (e.g., 13 or 14) fields, such as a destination IP address field, a source IP address field, a version number field, a protocol field, a time to live field, a header checksum field, a fragment offset field, and a total length field. TCP header information may include data stored in one or more (e.g., 10) fields, such as a destination port identifier field, a source port identifier field, a sequence number field, a data offset field, an acknowledgement number field, a checksum field, and/or a flag(s) field.

Payload portions associated with frames 200, 202, and 204 may include zero or more bytes of data. For example, a payload contained in frame 200 may include data (e.g., a byte sequence) represented by the text "SENT_ON". In some embodiments, payload information (e.g., a byte sequence) may be segmented or distributed across two packets. For example, a payload contained in frame 202 may include a portion of data (e.g., "SENT") and a payload contained in frame 204 may include the remaining portion of the data (e.g., "_ON").

Figure 3:
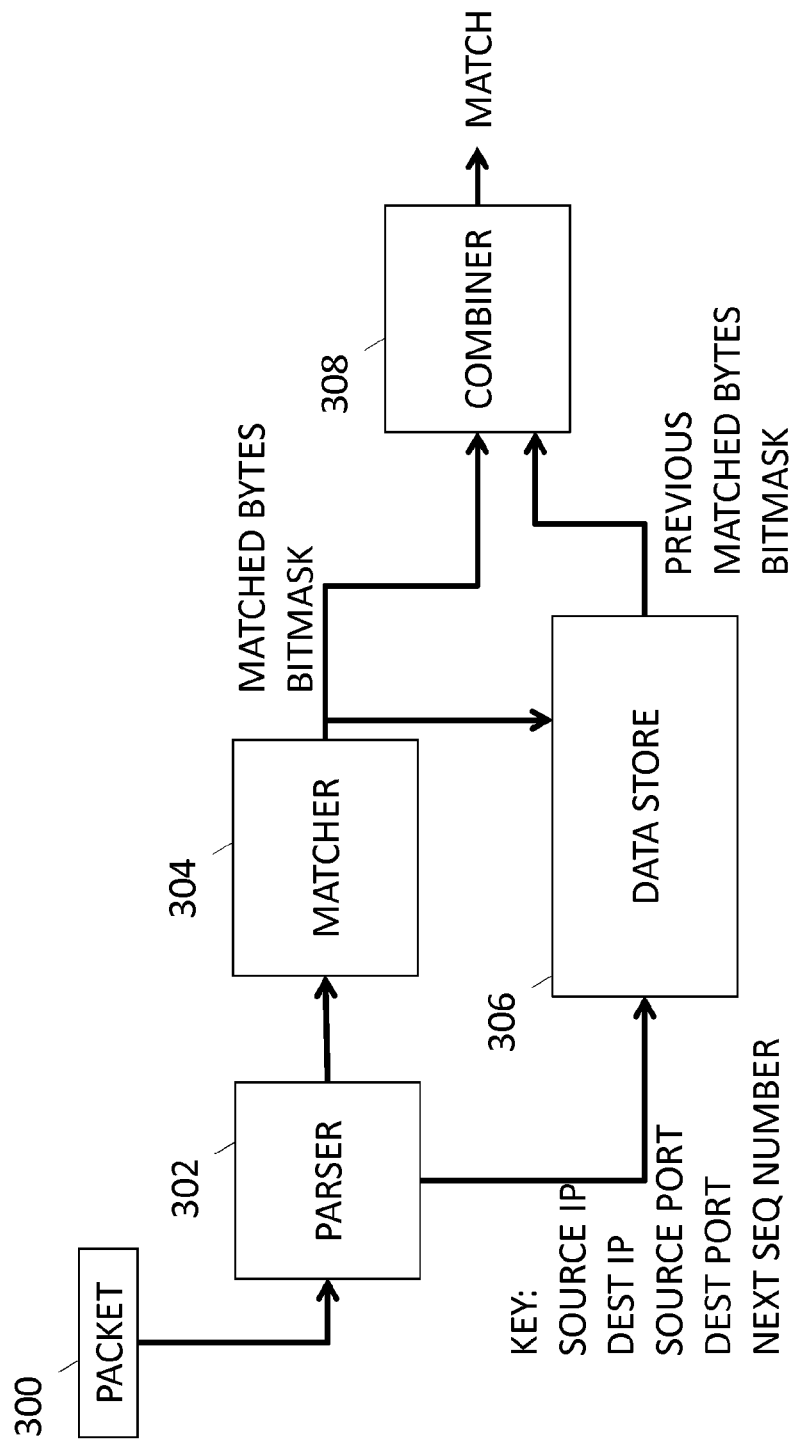
FIG. 3 is a diagram illustrating payload pattern matching according to an embodiment of the subject matter described herein.

FIG. 3 is a diagram illustrating payload pattern matching according to an embodiment of the subject matter described herein. In some embodiments, aspects associated with payload pattern matching may be performed by FMM A, components therein, or another node or module.

Referring to FIG. 3, a packet 300 may be received by a parser 302. Parser 302 may represent any suitable entity (e.g., a processor, a FPGA, or an ASIC) for parsing packet 302 and may include functionality for separating header information, or a portion thereof, from payload information associated with packet 300. Header information, or a portion thereof (e.g., a flow identifying tuple and sequence identifying information), may be sent from parser 302 to data store 306.

Data store 306 may represent any suitable entity (e.g., FMM storage 104) for storing flow identifying tuples or other information, e.g., sequence identifying information, byte offset information, message offset information, packet identifier(s), and/or matched bytes bitmasks. For example, data store 306 may store an entry related to packet 300, where a flow identifying tuple is a key value and is usable for indicating a corresponding delta byte length value and/or match related information, such as a matched bytes bitmask.

Payload information, or a portion thereof, may be sent from parser 302 to matcher 304. Matcher 304 may be any suitable entity (e.g., a processor, a FPGA, or an ASIC) for identifying data in the payload portion that needs to be modified (e.g., deleted, changed, or replaced). In some embodiments, matcher 304 may be configured to use a target data pattern, such as a regular expression or a byte sequence, where if the payload information includes the target data pattern, or a portion thereof, matcher 302 notifies one or more entities. For example, assuming a target data pattern is "SENT_ON" and packet 300 includes payload information where the last bytes of the payload information are represented by "SENT", matcher 304 may send information to data store 306 indicating that packet 300 contains a partial match.

In some embodiments, data store 306 may receive or generate a matched bytes bitmask (e.g., "1111000") for indicating that a portion of a target data pattern (e.g., "SENT") is found and that a remaining portion of the target data pattern (e.g., "_ON") may be found in a sequentially subsequent packet. For example, matcher 304 may receive a sequentially subsequent (e.g., next) packet including payload information where the first bytes of the payload information are represented by "_ON". In this example, matcher 304 may send information to data store 306 indicating that this next packet 300 contains a partial match and may be stored at data store 306 as a matched bytes bitmask (e.g., "0000111").

After matching at least a portion of the target data pattern, matcher 304 may send information to combiner 308 indicating that packet 300 contains at least a partial match. Combiner 308 may be any suitable entity (e.g., a processor, a FPGA, or an ASIC) for determining whether received matched data and stored matched data (e.g., at data store 306) indicate a complete match. For example, if a partial match is found in a current packet, combiner 308 may request, from data store 306, previously matched bytes bitmask(s) related to a relevant packet or packet flow and after receiving one or more relevant bitmasks. Combiner 306 may concatenate the bits from data store 306 ("0000111") with the bits from the current packet ("1111000") to form a longer, combined bitmask (e.g., "00001111111000" or "00011111110000").

In some embodiments, the concatenation order associated with the combined bitmask may depend on the sequence numbers associated with the respective packets. For example, stored bits associated with a preceding packet to a current packet (e.g., as indicated by sequence numbers) may appear in the combined bitmask prior to the bits associated with the current packet. In another example, stored bits associated with a subsequent packet (e.g., as indicated by sequence numbers) to the current packet may appear in the combined bitmask after the bits associated with the current packet.

In some embodiments, combiner 308 may identify a match if a resulting bitmask (e.g., "00001111111000") indicates bytes matching the target data pattern were found. For example, seven consecutive "1" values may indicate a match. In another example, where combiner 306 is looking for fixed byte offsets, the target data pattern (e.g., seven consecutive "1" values) may need to be aligned, floated, or transposed to a certain bit position when attempting to identify a match. In yet another example, where combiner 306 is looking for a floating match (e.g., a non-fixed location match), the target data pattern (e.g., seven consecutive "1" values) may need to be aligned, floated, or transposed to multiple bit positions when attempting to identify a match. In yet another example, if a complete match is found in the current packet, combiner 308 may indicate a match without requesting bitmask information from data store 306.

Figure 4:
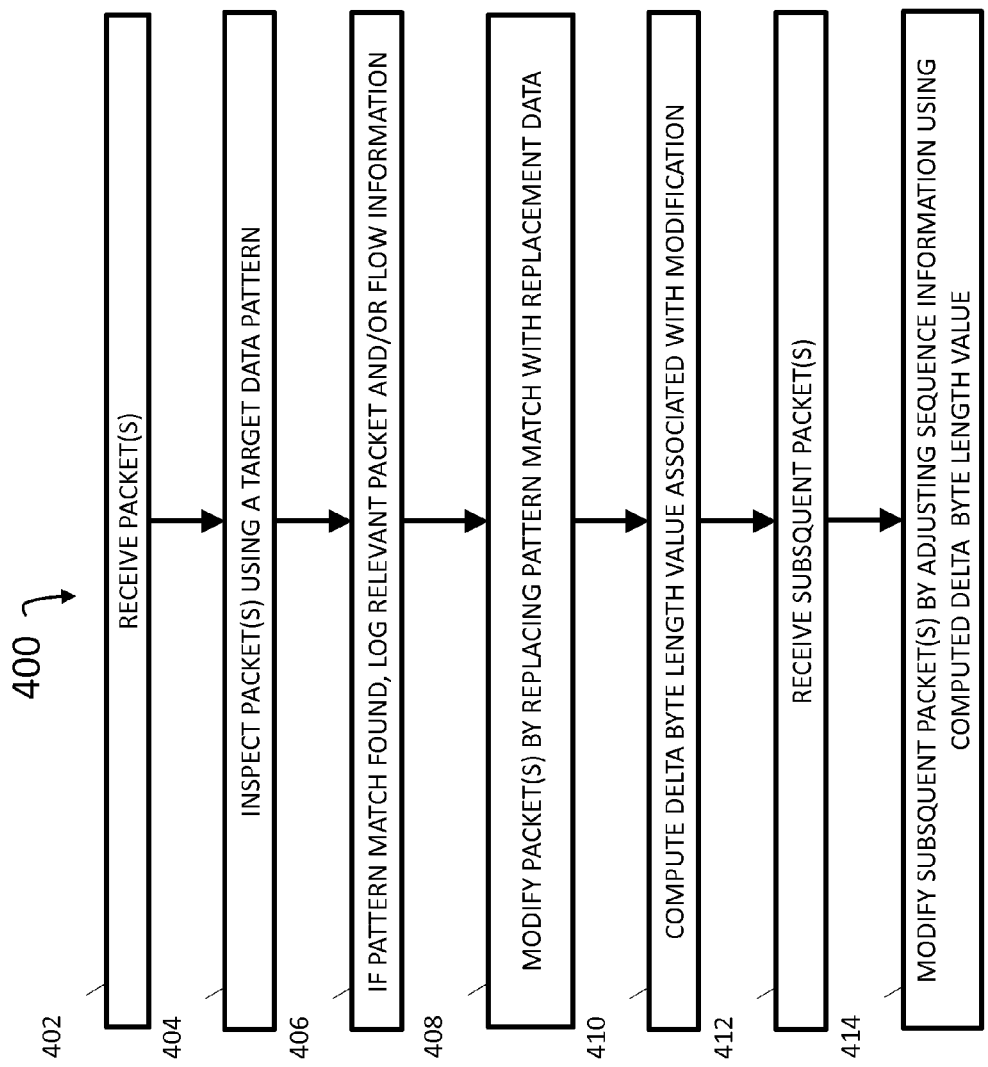
FIG. 4 is a diagram illustrating an exemplary process for searching and replacing a payload portion of a packet according to an embodiment of the subject matter described herein.

FIG. 4 is a diagram illustrating an exemplary process for searching and replacing a payload portion of a packet according to an embodiment of the subject matter described herein. In some embodiments, exemplary process 400, or portions thereof, may be performed by or at FMM 102 (e.g., an IP packet interceptor or inspection device) and/or another node or module.

At step 402, one or more packets associated with a packet flow may be received. For example, an IP packet including a TCP header portion and a payload portion may be received.

At step 404, one or more packets may be inspected using a target data pattern. For example, a target data pattern may be a search pattern represented by a byte sequence (e.g., "SENT_ON") or a regular expression (e.g., "S . . . N"). In this example, the regular expression (e.g., "S . . . N") may represent a search pattern, where different bytes sequences (e.g., "SENT_ON", "SEND IN", and "SIMPSON") can be matched by the same regular expression.

At step 406, if a pattern match is found, relevant packet and/or flow information may be logged. For example, FMM 102 may store an association between a flow identifying tuple and a related delta byte length value.

At step 408, the one or more packets may be modified by replacing the pattern match of step 406 with replacement data. For example, a pattern match may be replaced with a user-defined byte sequence or a byte sequence generated using a replacement data pattern or other information.

At step 410, a delta byte length value associated with the modification of 408 may be computed. For example, if a modified payload portion is "MAILED" (6 bytes) and an original payload portion is "SENT_ON" (7 bytes), the delta byte length value (e.g., difference between the byte size of the modified payload information and the byte size of the original payload information) may be "−1".

At step 412, one or more subsequent packets associated with the packet flow may be received. For example, an IP packet that sequentially follows the one or more packets of step 402 may be received. It will be appreciated that a subsequent packet is generally associated with a sequence number that is higher than a sequence number associated with a preceding packet. However, there may be some scenarios where a subsequent packet is associated with a lower sequence number than a preceding packet. For example, some protocols may use a finite number space or range for sequence numbers (e.g., 0 to 2*32−1) and, as such, assigned sequence numbers may loop or wrap (e.g., back to 0) such that the sequence numbers stay within the finite number space. Since a sequence number space may be finite, relationships between subsequent and/or proceeding packets may be determine by comparing packet sequence numbers after modifying each sequence number using a modulo operation, e.g., by comparing packet1_sequence_number modulo 2*32 to packet2_sequence_number modulo 2*32.

At step 414, subsequent packets may be modified. For example, a subsequent packet may include a TCP SeqID value that may be modified based on a delta byte length value associated with the payload modification of step 408. For example, if a delta byte length value is "−1", a TCP SeqID value may be decreased by one for all subsequent packets associated with a packet flow (e.g., unless additional payload modifications associated with the packet flow alters the delta byte length value).

It will also be appreciated that exemplary process 400 is for illustrative purposes and that different and/or additional actions may be used. It will also be appreciated that various actions described herein may occur in a different order or sequence.

Figure 5:
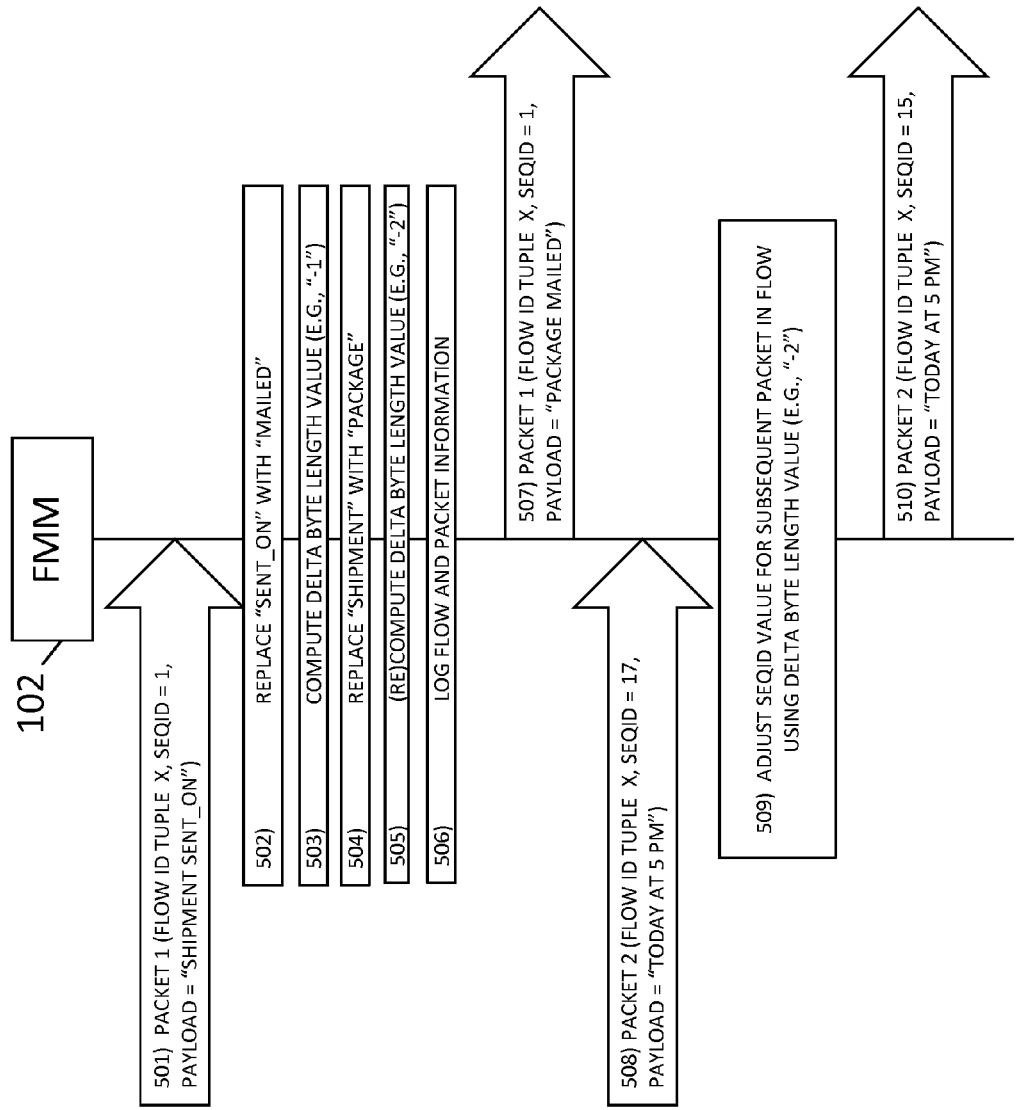
FIG. 5 is a diagram illustrating an exemplary messages associated with packet flow modification according to an embodiment of the subject matter described herein.

FIG. 5 is a diagram illustrating an exemplary messages associated with packet flow modification according to an embodiment of the subject matter described herein. In some embodiments, multiple modifications may be performed in one or more packets of a same flow. In such embodiments, various data may be maintained and computed such that the modified packets and/or subsequent packets in the flow include valid transport layer or higher layer information, e.g., accurate SeqID values. For example, a delta byte length value may be (re)computed and/or updated multiple times for a given flow such that modified packets and/or related packets in the flow contain valid transport layer or higher layer information, e.g., accurate SeqID values.

At step 501, a packet associated with a packet flow may be received at FMM 102 and may include data represented as a flow identifying tuple "X", a SeqID value "1", and a payload containing "SHIPMENT SENT_ON".

In some embodiments, FMM 102 may inspect or search, using a target data pattern, a payload portion of the packet of step 501 for particular data that matches the target data pattern.

In some embodiments, FMM 102 may identify or select, using relative location information (e.g., offset values), particular data in a payload portion of the packet of step 501 for modification. For example, FMM 102 may be configured to modify bytes between a first byte offset and a second byte offset, where the first byte offset and the second byte offset are associated with a packet or a related flow. In another example, FMM 102 may be configured to modify certain bytes in a packet, where the bytes are determined by one or more bytes offset and/or a target data pattern and the packet is determined by one or more message offsets associated with a corresponding packet flow.

At step 502, FMM 102 may replace the byte sequence "SENT_ON" with the byte sequence "MAILED". For example, after determining that "SENT_ON" is data to be modified in a payload portion, FMM 102 may modify the payload portion such that the byte sequence "MAILED" replaces the byte sequence "SENT_ON".

At step 503, a delta byte length value associated with the modification of 502 may be computed. For example, if a modified payload portion is "MAILED" (6 bytes) and an original payload portion is "SENT_ON" (7 bytes), the delta byte length value) may be "−1".

In some embodiments, FMM 102 may identify multiple portions of data (e.g., sets of byte sequences) in a payload portion of the packet of step 501 for modification. For example, after using a first target data pattern to find and replace a first match, FMM 102 may be configured to find additional matches using the first target data pattern or additional target data patterns.

At step 504, FMM 102 may replace the byte sequence "SHIPMENT" with the byte sequence "PACKAGE". For example, after determining that "SHIPMENT" is data to be modified in a payload portion, FMM 102 may modify the payload portion such that the byte sequence "PACKAGE" replaces the byte sequence "SHIPMENT".

At step 505, a delta byte length value may be (re) computed. For example, if a modified payload portion is "SHIPMENT" (8 bytes) and an original payload portion is "PACKAGE" (7 bytes), the current modification's effect on a delta byte length value may be "−1". In this example, the current modification's effect on the delta byte length value (e.g., "−1") may be added to an existing delta byte length value (e.g., "−1"), thereby resulting in a current delta byte length value (e.g., "−2").

At step 506, relevant packet and/or flow information may be logged or updated. For example, FMM 102 may store an association between a flow identifying tuple and a related delta byte length value.

At step 507, after performing any additional packet processing, the modified packet may be sent to another hop or destination. For example, after modifying payload information and modifying one or more checksums associated with a packet, FMM 102 may forward the packet to node B 106.

At step 508, a subsequent packet associated with the packet flow may be received at FMM 102 and may include data represented as a flow identifying tuple "X", a SeqID value "17", and a payload containing "TODAY AT 5 PM".

In some embodiments, a SeqID value may typically refer to an accumulated sequence number of the first data byte of a packet (e.g., segment) for a given session (e.g., a packet flow). For example, prior to modifying the packet of step 501, the payload portion may include 16 bytes. As such, prior to modifying the packet of step 501, a SeqID value "17" stored in the subsequent packet may be appropriate. However, because the modified payload portion of the packet of step 501 includes 14 bytes, the SeqID value for the subsequent packet may need to be adjusted to "15".

At step 509, the subsequent packet may be modified. For example, a subsequent packet may include a TCP SeqID value that may be modified based on a delta byte length value. For example, if a delta byte length value is "−2", the TCP SeqID value associated with the packet of step 508 may be decreased by two, e.g., from "17" to "15".

At step 510, after performing any additional packet processing, the modified subsequent packet may be sent to another hop or destination.

It will also be appreciated that the above described messages are for illustrative purposes and that different and/or additional messages may be used.

Figure 6:
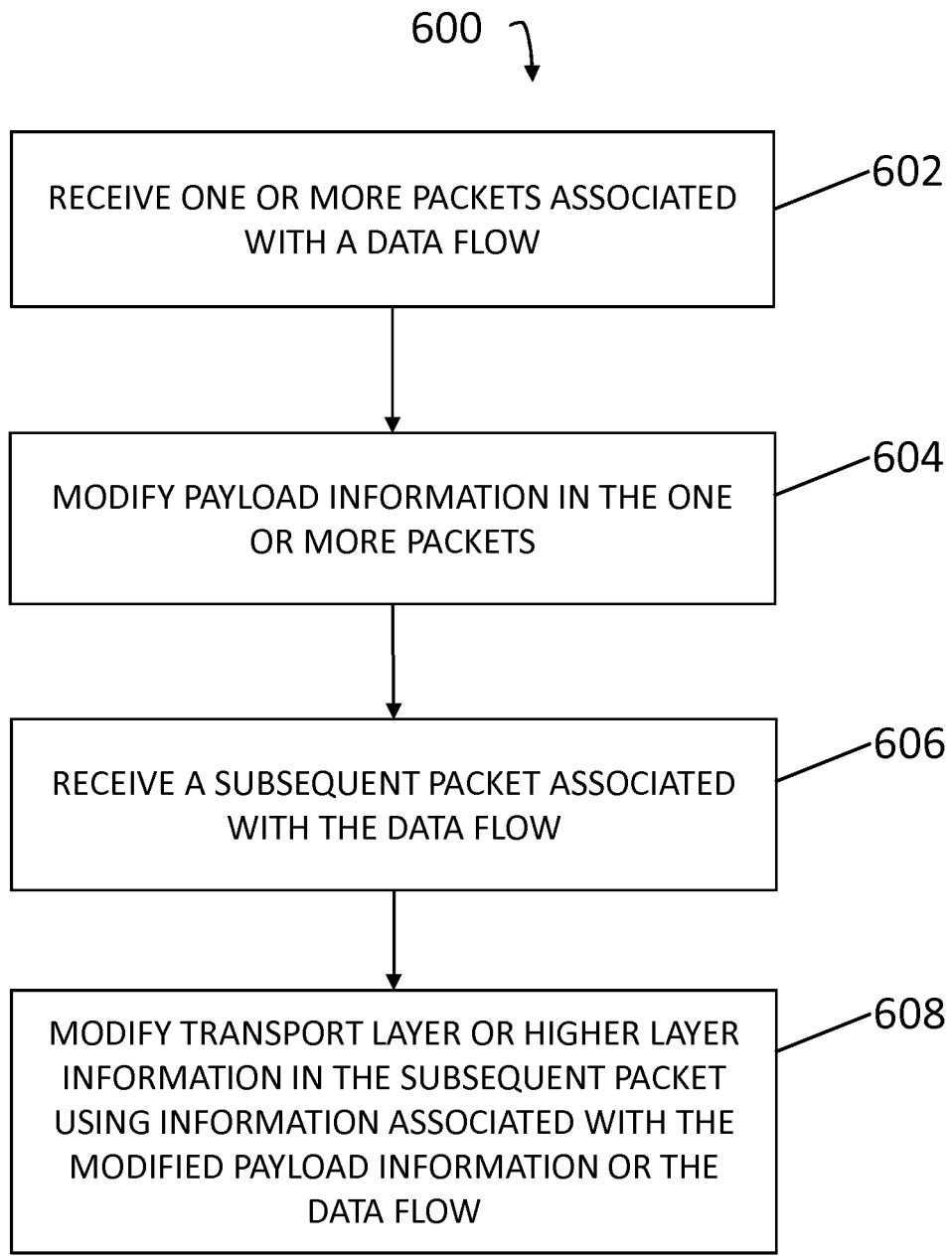
FIG. 6 is a diagram illustrating an exemplary process for packet flow modification according to an embodiment of the subject matter described herein.

FIG. 6 is a diagram illustrating an exemplary process for packet flow modification according to an embodiment of the subject matter described herein. In some embodiments, exemplary process 600, or portions thereof, may be performed by or at FMM 102 (e.g., an IP packet interceptor or inspection device), and/or another node or module. In some embodiments, exemplary process may include steps 602, 604, 606, and/or 608.

At step 602, one or more packets associated with a packet flow may be received. For example, an IP packet including a TCP header portion and a payload portion may be received. In this example, the IP packet may include header information usable identifying a particular packet flow (e.g., a flow identifying tuple).

At step 604, payload information may be modified in at least one of the one or more packets. For example, FMM 102 may be configured to inspect received packets for a certain sequence of data (e.g., a text phrase or regular expression in a payload portion) and, if found, may be configured to replace the certain sequence of data with different data or to delete the certain sequence of data. After modify the payload information, additional processing and/or modifications may be performed. For example, a CRC may be recomputed and/or header information may be modified prior to sending a modified IP packet to a destination.

At step 606, a subsequent packet associated with the packet flow may be received. For example, a subsequent packet may be a packet associated with a previously received packet where its payload information modified.

At step 608, transport layer or higher layer information in the subsequent packet may be modified using information associated with the modified payload information or the packet flow. For example, if payload information has been modified in a previously received TCP packet and the delta byte length value (e.g., change in byte size) was "−2" bytes, then a TCP SeqID parameter value associated with the subsequent packet may be decreased by 2 (e.g., SeqID: "30" would be changed to SeqID: "28").

In some embodiments, modifying payload information in at least one packet may include modifying one or more bytes of the payload information.

In some embodiments, one or more bytes of modified payload information may be stored in one or more packets.

In some embodiments, modifying payload information in at least one packet may include generating an additional packet containing at least some of the payload information.

In some embodiments, modifying transport layer or higher layer information in the subsequent packet may include adjusting sequence identifying information (e.g., a byte sequence number or a message sequence number) associated with the packet flow. Exemplary transport layer or higher information may include checksum information, byte sequence information, or message sequence information.

In some embodiments, information associated with modified payload information or the packet flow may include a flow identifying tuple for identifying packets associated with a packet flow, byte sequence identifying information, message sequence identifying information, maximum segment size information, packet byte size information, packet length information, or difference in byte size between unmodified payload information and modified payload information.

In some embodiments, modifying payload information in at least one packet may include identifying, using a target data pattern, a pattern match in the payload information and replacing the pattern match with replacement data in the payload information.

In some embodiments, at least some of a pattern match or at least some of a replacement data may be located in multiple packets.

In some embodiments, modifying payload information in at least one packet may be based on a certain location (e.g., a byte offset) in the at least one packet and/or may be based on a certain location (e.g., a message offset) in a related packet flow.

In some embodiments, FMM 102 may be implemented using a processor, a computing platform, a logic device, a field-programmable gate array, or an application specific integrated circuit. For example, packet flow modification may be performed by a processor, a computing platform, a programmable or non-programmable logic device, a field-programmable gate array, or an application specific integrated circuit.

In some embodiments, FMM 102 may be configured to perform packet flow modification at or near line rate. For example, packet flow modification may be performed at or near line rate.

It will also be appreciated that exemplary process 600 is for illustrative purposes and that different and/or additional actions may be used. It will also be appreciated that various actions described herein may occur in a different order or sequence.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for packet flow modification, the method comprising:

receiving one or more packets associated with a packet flow;

modifying payload information in the one or more packets;

receiving a subsequent packet associated with the packet flow; and modifying transport layer or higher layer information in the subsequent packet using information associated with the modified payload information or the packet flow, wherein modifying transport layer or higher layer information in the subsequent packet includes adjusting sequence identifying information in the subsequent packet based on the modified payload information in the one or more packets, wherein adjusting the sequence identifying information includes modifying a sequence identifier using a delta byte length value associated with the modified payload information, wherein packet flow modification is performed at line rate or near line rate by avoiding de-packetization of the subsequent packet into a data stream prior to adjusting sequence identifying information in the subsequent packet.

2. The method of claim 1 wherein modifying the payload information in the one or more packets includes modifying one or more bytes of the payload information.

3. The method of claim 2 wherein the payload information is stored in two or more packets.

4. The method of claim 1 wherein modifying the payload information in the one or more packets includes generating an additional packet containing at least some of the payload information.

5. The method of claim 1 wherein the information associated with the modified payload information or the packet flow includes a flow identifying tuple for identifying packets associated with the packet flow, byte sequence identifying information, message sequence identifying information, maximum segment size information, packet byte size information, packet length information, or difference in byte size between unmodified payload information and the modified payload information.

6. The method of claim 1 wherein modifying the payload information in the one or more packets includes:

identifying, using a target data pattern, a pattern match in the payload information; and replacing the pattern match or related data with replacement data in the payload information.

7. The method of claim 6 wherein at least some of the pattern match or at least some of the replacement data is located in multiple packets.

8. The method of claim 1 wherein modifying the payload information in the one or more packets includes modifying the payload information based on a location in the one or more packets, a certain location in the packet flow, a byte offset, or a message offset.

9. The method of claim 1 wherein the method for packet flow modification is performed by a processor, a computing platform, a logic device, a field-programmable gate array, or an application specific integrated circuit.

10. A system for packet flow modification, the system comprising:

a non-transitory computer readable medium; and a flow modification module (FMM) implemented using the non-transitory computer readable medium, the FMM configured to:

receive one or more packets associated with a packet flow;

modify payload information in the one or more packets;

receive a subsequent packet associated with the packet flow; and modify transport layer or higher layer information in the subsequent packet using information associated with the modified payload information or the packet flow, wherein the FMM is configured to modify transport layer or higher layer information in the subsequent packet by adjusting sequence identifying information in the subsequent packet based on the modified payload information in the one or more packets, wherein adjusting the sequence identifying information includes modifying a sequence identifier using a delta byte length value associated with the modified payload information, wherein the FMM is configured to perform packet flow modification at line rate or near line rate by avoiding de-packetization of the subsequent packet into a data stream prior to adjusting sequence identifying information in the subsequent packet.

11. The system of claim 10 wherein the FMM is configured to modify one or more bytes of the payload information.

12. The system of claim 11 wherein the payload information is stored in two or more packets.

13. The system of claim 10 wherein the FMM is configured to generate an additional packet containing at least some of the payload information.

14. The system of claim 10 wherein the information associated with the modified payload information or the packet flow includes a flow identifying tuple for identifying packets associated with the packet flow, byte sequence identifying information, message sequence identifying information, maximum segment size information, packet byte size information, packet length information, or difference in byte size between unmodified payload information and the modified payload information.

15. The system of claim 10 wherein the FMM is configured to modify the payload information in the one or more packets by:
    identifying, using a target data pattern, a pattern match in the payload information; and
    replacing the pattern match or related data with replacement data in the payload information.

16. The system of claim 15 wherein at least some of the pattern match or at least some of the replacement data is located in multiple packets.

17. The system of claim 10 wherein the FMM is configured to modify the payload information based on a location in the one or more packets, a certain location in the packet flow, a byte offset, or a message offset.

18. The system of claim 10 wherein the FMM is implemented using a processor, a computing platform, a logic device, a field-programmable gate array, or an application specific integrated circuit.

19. A non-transitory computer readable medium comprising computer executable instructions embodied in the computer readable medium that when executed by a processor of a computer perform steps comprising:
    receiving one or more packets associated with a packet flow;
    modifying payload information in the one or more packets;
    receiving a subsequent packet associated with the packet flow; and
    modifying transport layer or higher layer information in the subsequent packet using information associated with the modified payload information or the packet flow, wherein modifying transport layer or higher layer information in the subsequent packet includes adjusting sequence identifying information in the subsequent packet based on the modified payload information in the one or more packets, wherein adjusting the sequence identifying information includes modifying a sequence identifier using a delta byte length value associated with the modified payload information, wherein packet flow modification is performed at line rate or near line rate by avoiding de-packetization of the subsequent packet into a data stream prior to adjusting sequence identifying information in the subsequent packet.

* * * * *